United States Patent
Shimada et al.

(10) Patent No.: US 8,324,123 B2
(45) Date of Patent: Dec. 4, 2012

(54) GLASS PLATE, PROCESS FOR PRODUCING IT, AND PROCESS FOR PRODUCING TFT PANEL

(75) Inventors: Yuya Shimada, Tokyo (JP); Manabu Nishizawa, Tokyo (JP); Junichiro Kase, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 126 days.

(21) Appl. No.: 12/693,482

(22) Filed: Jan. 26, 2010

(65) Prior Publication Data

US 2010/0129944 A1   May 27, 2010

Related U.S. Application Data

(63) Continuation of application No. PCT/JP2008/065335, filed on Aug. 27, 2008.

(30) Foreign Application Priority Data

Aug. 31, 2007   (JP) ................. 2007-225945

(51) Int. Cl.
*C03C 3/085* (2006.01)
*C03C 3/087* (2006.01)
*C03B 18/02* (2006.01)

(52) U.S. Cl. .................. 501/69; 501/66; 501/70; 65/90; 438/778

(58) Field of Classification Search .................. 501/66, 501/69, 70; 65/90; 438/778
See application file for complete search history.

(56) References Cited

U.S. PATENT DOCUMENTS

| | | | |
|---|---|---|---|
| 4,640,900 A | | 2/1987 | Kokubu et al. |
| 5,888,917 A * | | 3/1999 | Kawaguchi et al. ............ 501/70 |
| 6,297,182 B1 * | | 10/2001 | Maeda et al. .................. 501/66 |
| 6,313,052 B1 * | | 11/2001 | Nakashima et al. ............ 501/69 |
| 6,949,485 B2 * | | 9/2005 | Nakashima et al. ............ 501/69 |
| 2002/0147102 A1 * | | 10/2002 | Yamazaki et al. .............. 501/70 |
| 2005/0096209 A1 * | | 5/2005 | Kase et al. ...................... 501/56 |
| 2009/0075805 A1 * | | 3/2009 | Kurachi et al. ................. 501/59 |
| 2010/0137122 A1 * | | 6/2010 | Nagai et al. .................... 501/70 |
| 2011/0003483 A1 * | | 1/2011 | Nishizawa et al. ........... 438/778 |

FOREIGN PATENT DOCUMENTS

| | | |
|---|---|---|
| JP | 60-042247 | 3/1985 |
| JP | 07-053230 | 2/1995 |
| JP | 2006-137631 | 6/2006 |
| JP | 2006-169028 | 6/2006 |
| WO | 2008-001555 | 1/2008 |
| WO | WO 2009131053 A1 * | 10/2009 |

OTHER PUBLICATIONS

U.S. Appl. No. 12/752,172, filed Apr. 1, 2010, Nishizawa, et al.
U.S. Appl. No. 13/243,641, filed Sep. 23, 2011, Nishizawa, et al.
U.S. Appl. No. 13/444,994, filed Apr. 12, 2012, Shimada, et al.

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

To provide a glass plate which has a low $B_2O_3$ content and which can be used as a glass plate for e.g. an LCD panel.

A glass plate which comprises, as a glass matrix composition as represented by mass % based on oxide, from 53 to 74 mass % of $SiO_2$, from 15 to 23 mass % of $Al_2O_3$, from 0 to 3 mass % of $B_2O_3$, from 2 to 17 mass % of MgO, from 0 to 12 mass % of CaO, from 0 to 6 mass % of SrO, from 6 to 28 mass % of MgO+CaO+SrO, from 0 to 9 mass % of $Na_2O$, from 0 to 6 mass % of $K_2O$ and from 0.8 to 11 mass % of $Na_2O+K_2O$, contains from 100 to 500 ppm of $SO_3$, has an average coefficient of thermal expansion from 50 to 350° C. of at most $60 \times 10^{-7}$/° C., and has a strain point of at least 600° C.

13 Claims, No Drawings

GLASS PLATE, PROCESS FOR PRODUCING IT, AND PROCESS FOR PRODUCING TFT PANEL

TECHNICAL FIELD

The present invention relates to a glass plate to be used for display panels such as a liquid crystal display (LCD) panel and a plasma display panel (PDP) and a substrate for a solar battery, and a process for producing it. The glass plate of the present invention is particularly suitable as a glass plate for an LCD panel.

BACKGROUND ART

Heretofore, as a glass substrate for an LCD panel, an alkali-free glass containing no alkali metal oxide has been used. The reason is that if an alkali metal oxide is contained in a glass substrate, alkali ions in the glass plate will be diffused into a semiconductor film of a thin film transistor (TFT) to be used for driving an LCD panel during heat treatment carried out in a process for producing an LCD panel, thus leading to deterioration of the TFT characteristics.

Further, since an alkali-free glass has a low coefficient of thermal expansion ($30 \times 10^{-7}$ to $60 \times 10^{-7}/°$ C.) and a high strain point, its change in dimensions in a process for producing an LCD panel is small, and the influence over the display quality by thermal stress at the time of use of the LCD panel is small, and accordingly it is preferred as a glass substrate for an LCD panel.

However, an alkali-free glass has the following drawbacks in view of production.

An alkali-free glass has very high viscosity and is hardly molten, and its production involves technical difficulty.

Further, in general, only a poor effect of a refining agent can be produced for an alkali-free glass. For example, in a case where $SO_3$ is used as the refining agent, since the temperature at which $SO_3$ is decomposed and released as bubbles is lower than the glass melting temperature, the most part of $SO_3$ added is decomposed and volatilized from the molten glass before refining is carried out, and no sufficient refining effect will be achieved.

In recent development of technology, use of an alkali glass substrate containing an alkali metal oxide as the glass substrate for an LCD panel begins to be studied (Patent Documents 1 and 2), since it becomes possible to carry out heat treatment in a process for producing a TFT panel at a relatively low temperature (about 250 to 300° C.) which has been carried out at from 350 to 450° C.

Since glass containing an alkali metal oxide generally has a high coefficient of thermal expansion, in order that it has a coefficient of thermal expansion ($30 \times 10^{-7}$ to $60 \times 10^{-7}/°$ C.) preferred as a glass substrate for an LCD panel, $B_2O_3$ having an effect to lower the coefficient of thermal expansion is usually contained (Patent Documents 1 and 2).

However, in the case of a glass composition containing $B_2O_3$, $B_2O_3$ is volatilized when the glass is melted particularly in a melting step and in a refining step, whereby the glass composition tends to be inhomogeneous. If the glass composition is inhomogeneous, flatness when the glass is formed into a plate shape tends to be influenced. A glass substrate for an LCD panel is required to have high flatness so as to keep a constant distance between two sheets of glass sandwiching a liquid crystal i.e. cell gap, so as to secure the display quality. Accordingly, in order to secure a predetermined flatness, after glass is formed into plate glass by float process, the surface of the plate glass is polished. If no desired flatness of the plate glass after forming is achieved, the time required for the polishing step will be long, thus lowering the productivity. Further, considering the environmental burden by volatilization of $B_2O_3$, the content of $B_2O_3$ in the molten glass is preferably lower.

However, if the $B_2O_3$ content is low, it has been difficult to lower the coefficient of thermal expansion. Further, it has also been difficult to obtain a predetermined strain point, etc. while the increase in the viscosity is suppressed.

Patent Document 1: JP-A-2006-137631
Patent Document 2: JP-A-2006-169028

DISCLOSURE OF THE INVENTION

Objects to be Accomplished by the Invention

In order to solve the above problems of prior art, the object of the present invention is to provide a glass plate which contains an alkali metal oxide and has a low $B_2O_3$ content, and which can be used as a glass substrate for an LCD panel or for a solar battery, and a process for producing such a glass plate by float process.

Particularly, as a result of extensive studies, the present inventors have found that in the above-described heat treatment at low temperature, the compaction (heat shrinkage) of glass at low temperature may greatly influence the film formation quality (film formation pattern accuracy) on a glass substrate.

The object of the present invention is to provide, more preferably, a glass plate for a display panel, with a low compaction at the time of heat treatment (specifically, heat treatment in a step of forming a gate insulating film) at low temperature (150 to 300° C.) in a process for producing a TFT panel, which can be suitably used as a glass substrate particularly for a large-sized (for example, a size with one side being 2 m or longer) TFT panel, and a process for producing it.

Means to Accomplish the Objects

To accomplish the above objects, the present invention provides a glass plate which comprises, as a glass matrix composition as represented by mass % based on oxide:

| | |
|---|---|
| $SiO_2$ | 53 to 74, |
| $Al_2O_3$ | 15 to 23, |
| $B_2O_3$ | 0 to 3, |
| MgO | 2 to 17, |
| CaO | 0 to 12, |
| SrO | 0 to 6, |
| MgO + CaO + SrO | 6 to 28, |
| $Na_2O$ | 0 to 9, |
| $K_2O$ | 0 to 6, and |
| $Na_2O + K_2O$ | 0.8 to 11 | contains from 100 to 500 ppm of $SO_3$, has an average coefficient of thermal expansion from 50 to 350° C. of at most $60 \times 10^{-7}/°$ C., and has a strain point of at least 600° C.

Further, the present invention provides a process for producing a glass plate, which comprises blending starting materials so as to obtain glass comprising as a glass matrix composition as represented by mass % based on oxide:

| | |
|---|---|
| $SiO_2$ | 53 to 74, |
| $Al_2O_3$ | 15 to 23, |

-continued

|  |  |
|---|---|
| $B_2O_3$ | 0 to 3, |
| MgO | 2 to 17, |
| CaO | 0 to 12, |
| SrO | 0 to 6, |
| MgO + CaO + SrO | 6 to 28, |
| $Na_2O$ | 0 to 9, |
| $K_2O$ | 0 to 6, and |
| $Na_2O + K_2O$ | 0.8 to 11 | adding a sulfate in an amount of from 0.05 to 1.0 mass % as calculated as $SO_3$ to 100 mass % of the starting materials to obtain a glass material, melting the glass material and forming the molten glass material into plate glass to obtain the glass plate as defined in claim 1.

Effects of the Invention

The glass plate of the present invention has an average coefficient of thermal expansion from 50 to 350° C. of at most $60 \times 10^{-7}/°$ C. and a strain point of at least 600° C., preferably at least 650° C., and accordingly the change in dimensions in a process for producing a panel is small, and the influence over the display quality by thermal stress at the time of use of the panel is small. Thus, the glass plate is suitable particularly as a glass substrate for an LCD panel.

Further, the glass plate of the present invention has a low $B_2O_3$ content, whereby volatilization of $B_2O_3$ is small at the time of production of glass. Accordingly, the glass plate is excellent in homogeneity and is excellent in flatness, and after a glass plate is formed, only a low degree of polishing of the glass plate surface is required, thus leading to excellent productivity.

Further, the glass plate of the present invention contains an alkali metal oxide, whereby it has a low viscosity, its starting material is easily melted, and its production is easy. Further, since the temperature at which $SO_3$ is decomposed and released as bubbles is higher than the temperature at which the starting materials become molten glass, an excellent refining effect by $SO_3$ is achieved, and excellent bubble quality is achieved.

Further, since formation is carried out by float process, a glass plate particularly for a large-sized display (for example, one side being 2 m or longer) can be efficiently produced stably.

Further, the glass plate of the present invention in a preferred embodiment (hereinafter referred to as an embodiment A) has a heat shrinkage (C) of at most 20 ppm, and accordingly the compaction is low in heat treatment at low temperature (150 to 300° C.) in a process for producing a TFT panel, and slippage of the film formation pattern on a glass substrate hardly occurs.

The glass plate of the present invention is suitable as a glass substrate for an LCD panel, and can be used as a substrate for other displays, such as a plasma display panel (PDP) and an inorganic electroluminescence display. For example, when it is used as a glass plate for PDP, since it has a low coefficient of thermal expansion as compared with a conventional glass plate for PDP, breakage of glass in the heat treatment step can be suppressed.

Further, the glass plate of the present invention can be used for application other than display panels. Specifically, it can be used, for example, as a glass plate for a solar battery substrate.

BEST MODE FOR CARRYING OUT THE INVENTION

Now, the glass plate of the present invention will be described in detail below.

The glass plate of the present invention comprises, as a glass matrix composition as represented by mass % based on oxide:

|  |  |
|---|---|
| $SiO_2$ | 53 to 74, |
| $Al_2O_3$ | 15 to 23, |
| $B_2O_3$ | 0 to 3, |
| MgO | 2 to 17, |
| CaO | 0 to 12, |
| SrO | 0 to 6, |
| MgO + CaO + SrO | 6 to 28, |
| $Na_2O$ | 0 to 9, |
| $K_2O$ | 0 to 6, and |
| $Na_2O + K_2O$ | 0.8 to 11 | contains from 100 to 500 ppm of $SO_3$, has an average coefficient of thermal expansion from 50 to 350° C. of at most $60 \times 10^{-7}/°$ C., and has a strain point of at least 600° C.

Preferably, the glass plate of the present invention contains substantially no $B_2O_3$, comprises as a glass matrix composition as represented by mass % based on oxide:

|  |  |
|---|---|
| $SiO_2$ | 53 to 74, |
| $Al_2O_3$ | 15 to 23, |
| MgO | 2 to 17, |
| CaO | 0 to 12, |
| SrO | 0 to 6, |
| MgO + CaO + SrO | 10 to 28, |
| $Na_2O$ | 0 to 9, |
| $K_2O$ | 0 to 6, and |
| $Na_2O + K_2O$ | 0.8 to 9 | contains from 100 to 500 ppm of $SO_3$, and has a strain point of at least 650° C.

The reason why the composition of the glass plate of the present invention is limited to the above is as follows.

The glass plate of the present invention has a $B_2O_3$ content of so low as at most 3 mass % (hereinafter simply referred to as %). Accordingly, in a melting step, a refining step and a forming step when glass is melted in production of a glass plate, particularly in a melting step and a refining step, volatilization of $B_2O_3$ is small, and a glass substrate to be produced is excellent in homogeneity and flatness. As a result, when the glass substrate is used as a glass plate for a LCD panel which requires a high degree of flatness, the amount of polishing the glass plate is small as compared with a conventional glass plate for a display panel.

Further, considering the environmental burden by volatilization of $B_2O_3$, the $B_2O_3$ content is preferably lower, and the $B_2O_3$ content is preferably from 0 to 2.0%. It is more preferred that substantially no $B_2O_3$ is contained.

Here, "substantially no $B_2O_3$ is contained" means that no $B_2O_3$ is contained except for inevitable impurities included from a raw material or the like. That is, $B_2O_3$ is not contained on purpose.

$SiO_2$: It is a component to form a skeleton of glass, and if its content is less than 53%, the heat resistance of glass tends to be poor, and the chemical durability will be decreased. However, if its content exceeds 74%, the high temperature viscosity of glass will be increased, and the melting property tends to be poor.

The $SiO_2$ content is preferably at least 55%, more preferably at least 57%, and considering the above reason and the reduction in the compaction, it is particularly preferably at least 58%. On the other hand, the $SiO_2$ content is preferably at most 67% from the above reason and with a view to obtaining an effect of lowering the compaction, and it is more preferably at most 64%, particularly preferably at most 63%.

$Al_2O_3$: It increases the glass transition point and improves the heat resistance and the chemical durability, but if its content is less than 15%, the coefficient of thermal expansion tends to be high, and the strain point will be decreased. However, if its content exceeds 23%, the high temperature viscosity of glass will be increased, and the melting properties tends to be poor. Further, the devitrification temperature will be increased, and the moldability tends to be poor.

The $Al_2O_3$ content is preferably from 15 to 21% from the above reason and with a view to obtaining an effect of lowering the compaction, and it is more preferably from 16 to 21%, particularly preferably from 17 to 20%.

MgO: It is contained since it has an effect to lower the viscosity when glass is melted thereby to accelerate melting, but if its content is less than 2%, the high temperature viscosity of glass will be increased, and the melting property tends to be poor. However, if its content exceeds 17%, the coefficient of thermal expansion of glass tends to be high.

The MgO content is preferably from 4 to 14% from the above reason and with a view to obtaining an effect of lowering the compaction, and it is more preferably from 4 to 13%, particularly preferably from 6 to 9%.

CaO: It may be contained since it has an effect to lower the viscosity when glass is melted thereby to accelerate melting. However, if its content exceeds 12%, the coefficient of thermal expansion of glass tends to be high.

The CaO content is preferably at least 1% from the above reason, and is more preferably at least 2%. On the other hand, the CaO content is preferably at most 8% from the above reason, and is more preferably at most 6%. Further, it is particularly preferably at most 5% with a view to obtaining an effect of lowering the compaction.

SrO: It may be contained since it has an effect to lower the viscosity when glass is melted thereby to accelerate melting. However, if its content exceeds 6%, the coefficient of thermal expansion of glass tends to be high, and the specific gravity of glass tends to be high.

The SrO content is preferably from 0 to 5%, more preferably from 0 to 3% from the above reason and with a view to obtaining an effect of lowering the compaction, and it is particularly preferably from 0 to 2%.

MgO, CaO and SrO are contained in a total content of at least 6% since they lower the viscosity of glass at the melting temperature thereby to facilitate melting. However, if the total content exceeds 28%, the coefficient of thermal expansion of glass tends to be high.

The total content of MgO, CaO and SrO is preferably from 10 to 28%, more preferably from 10 to 20%, particularly preferably from 10 to 19% from the above reason and with a view to obtaining an effect of lowering the compaction, and it is particularly preferably from 11 to 14%.

Further, BaO may be contained so as to obtain the same effect as MgO, CaO and SrO. However, incorporation of BaO brings about an increase in the specific gravity (density) of glass and an increase in the coefficient of thermal expansion, and accordingly its content is preferably at most 5%.

Further, in a case where BaO is contained, the total content of MgO, CaO, SrO and BaO is preferably from 6.5 to 28%, more preferably from 10.5 to 28%, furthermore preferably from 10.5 to 20%, particularly preferably from 10.5 to 19% from the above reason and with a view to obtaining an effect of lowering the compaction, and it is particularly preferably from 12 to 15%.

However, considering the environmental burden, it is preferred that substantially no BaO is contained.

$Na_2O$: It is contained in an amount of from 0 to 9% in order to lower the viscosity at the melting temperature of glass thereby to facilitate melting. However, if its content exceeds 9%, the coefficient of thermal expansion tends to be high.

The $Na_2O$ content is preferably at least 1% from the above reason and with a view to obtaining an effect of lowering the compaction. On the other hand, the $Na_2O$ content is preferably at most 5% from the above reason and with a view to obtaining an effect of lowering the compaction, and is more preferably at most 3%.

$K_2O$: It is contained in an amount of from 0 to 6% since it has the same effect as $Na_2O$. However, if its content exceeds 6%, the coefficient of thermal expansion tends to be high.

The $K_2O$ content is preferably from 0 to 5% from the above reason and with a view to obtaining an effect of lowering the compaction, and is more preferably from 1 to 3%.

$Na_2O$, $K_2O$: At least one of them is essential, and they are contained in a total content of at least 0.8%. However, if the total content exceeds 11%, the coefficient of thermal expansion tends to be high. The total content is preferably from 1 to 11%, more preferably from 2 to 11%. Further, the total content is preferably from 1 to 9% from the above reason and with a view to obtaining an effect of lowering the compaction, and it is more preferably from 2 to 9%, particularly preferably from 4 to 7%.

Further, $Li_2O$ may be contained so as to obtain the same effect as $Na_2O$ and $K_2O$. However, incorporation of $Li_2O$ brings about a decrease in the strain point, and accordingly the $Li_2O$ content is preferably at most 5%.

Further, in a case where $Li_2O$ is contained, the total content of $Na_2O$, $K_2O$ and $Li_2O$ is preferably from 1 to 9%, more preferably from 4 to 7%. However, considering to maintain a high strain point and to maintain a high refining effect by $SO_3$, it is preferred that substantially no $Li_2O$ is contained.

Accordingly, the glass plate of the present invention preferably comprises, as a glass matrix composition, $B_2O_3$, $SiO_2$, $Al_2O_3$, MgO, CaO, SrO, $Na_2O$ and $K_2O$.

$SO_3$: In the case of an alkali-containing glass, $SO_3$ can achieve a sufficient effect as a refining agent, since the temperature at which $SO_3$ is decomposed and released as bubbles is higher than the temperature at which the starting materials become molten glass.

As a $SO_3$ source, a sulfate such as potassium sulfate ($K_2SO_4$), sodium sulfate ($Na_2SO_4$) or calcium sulfate ($CaSO_4$) is charged into the glass material, and the amount of the sulfate is preferably from 0.05 to 1.0%, more preferably from 0.05 to 0.3% as calculated as $SO_3$ to 100 mass % of the starting materials. The remaining amount in the glass substrate is from 100 to 500 ppm, preferably from 100 to 400 ppm as calculated as $SO_3$.

The glass plate of the present invention may contain other components in addition to the above components within a range not to impair the glass substrate. Specifically, it may contain F, Cl and $SnO_2$ in a total content of at most 2% so as to improve the melting property of glass and the refining property.

Further, it may contain $ZrO_2$, $Y_2O_3$, $La_2O_3$, $TiO_2$ and $SnO_2$ in a total content of at most 5% so as to improve the chemical durability of the substrate glass. Among them, $Y_2O_3$, $La_2O_3$ and $TiO_2$ contribute also to an improvement in the Young's modulus of glass.

Further, it may contain a colorant such as $Fe_2O_3$ or $CeO_2$ so as to adjust the color tone of the substrate glass. The content of such a colorant is preferably at most 1 mass % in total.

The glass plate of the present invention preferably contains substantially no $As_2O_3$ nor $Sb_2O_3$ considering the environmental burden. Further, it preferably contains substantially no ZnO considering to carry out float process stably.

Now, an embodiment A which is a preferred embodiment of a glass plate of the present invention is as follows.

Embodiment A

A glass plate which comprises, as a glass matrix composition as represented by mass % based on oxide:

| | |
|---|---|
| $SiO_2$ | 58 to 67, |
| $Al_2O_3$ | 15 to 21, |
| $B_2O_3$ | 0 to 3, |
| MgO | 4 to 14, |
| CaO | 0 to 5, |
| SrO | 0 to 3, |
| MgO + CaO + SrO | 6 to 19, |
| $Na_2O$ | 1 to 9, |
| $K_2O$ | 0 to 5, and |
| $Na_2O + K_2O$ | 1 to 11 | contains from 100 to 500 ppm of $SO_3$ and has a heat shrinkage (C) of at most 20 ppm.

More preferably, a glass plate which contains substantially no $B_2O_3$, comprises as a glass matrix composition as represented by mass % based on oxide:

| | |
|---|---|
| $SiO_2$ | 58 to 67, |
| $Al_2O_3$ | 15 to 21, |
| MgO | 4 to 14, |
| CaO | 0 to 5, |
| SrO | 0 to 3, |
| MgO + CaO + SrO | 10 to 19, |
| $Na_2O$ | 1 to 9, |
| $K_2O$ | 0 to 5, and |
| $Na_2O + K_2O$ | 1 to 9 | contains from 100 to 500 ppm of $SO_3$ and has a heat shrinkage (C) of at most 20 ppm.

Here, the compaction means the glass heat shrinkage caused by relaxation of the glass structure at the time of heat treatment.

In the present invention, the heat shrinkage (C) (compaction (C)) means a shrinkage (ppm) in a distance between indentations obtained in such a manner that a glass plate is heated to the transition temperature Tg+50° C., held for one minute and then cooled to room temperature at 50° C./min, indentations are impressed on two portions with a predetermined distance on the surface of the glass plate, and then the glass plate is heated to 300° C., held for one hour and then cooled to room temperature at 100° C./hour.

The compaction (C) will be described more specifically.

In the present invention, the compaction (C) means a value measured by a method described below.

First, a glass plate to be measured is melted at 1,600° C., and the molten glass is cast, formed into a plate shape and then cooled. The obtained glass plate is subjected to polishing to obtain a sample of 100 mm×20 mm×2 mm.

Then, the obtained glass plate is heated to the transition temperature Tg+50° C., held at this temperature for one minute and then cooled to room temperature at a temperature-lowering rate of 50° C./min. Then, indentations are impressed at two portions in the long side direction with a distance A (A=90 mm) on the surface of the glass plate.

Then, the glass plate is heated to 300° C. at a temperature-increasing rate of 100° C./hour (=1.6° C./min), held at 300° C. for one hour, and then cooled to room temperature at a temperature-lowering rate of 100° C./hour. Then, the distance between the indentations are measured again, which is regarded as B. From A and B thus obtained, the compaction (C) is calculated by means of the following formula. Further, A and B are measured by an optical microscope.

$$C[\text{ppm}]=(A-B)/A \times 10^6$$

The glass plate of the present invention has an average coefficient of thermal expansion from 50 to 350° C. of at most $60 \times 10^{-7}$/° C. Accordingly, in a case where the glass plate of the present invention is used as a glass plate for an LCD panel, the change in dimensions of a substrate in a heat treatment step carried out in production of an LCD panel can be suppressed to a level comparable to conventional alkali-free glass.

The average coefficient of thermal expansion from 50 to 350° C. is preferably at most $56 \times 10^{-7}$/° C., more preferably from $40 \times 10^{-7}$/° C. to $53 \times 10^{-7}$/° C.

Further, the allowable value of the change in dimensions of a substrate in a heat treatment step carried out in production of an LCD panel varies depending on the size of the LCD panel. Therefore, the coefficient of thermal expansion of a glass plate (the average coefficient of thermal expansion from 50 to 350° C.) can be properly selected depending on the size of an LCD panel to be produced from a range of at most $60 \times 10^{-7}$/° C., preferably at most $56 \times 10^{-7}$/° C., more preferably from $40 \times 10^{-7}$ to $53 \times 10^{-7}$.

The glass plate of the present invention has a strain point of at least 600° C. When the strain point is at least 600° C., the change in dimensions of a substrate in a heat treatment step carried out in production of an LCD panel can be suppressed low to a substantially unproblematic extent. The strain point is preferably at least 650° C., more preferably at least 660° C.

Further, in the present invention, the strain point means a value measured in accordance with JIS R3103.

Further, the glass transition point (Tg) is preferably at least 680° C. from the same reason as that of the strain point, and it is more preferably at least 690° C., furthermore preferably at least 700° C.

The glass substrate of the present invention preferably has a specific gravity of at most 2.70. Particularly in a case where the glass substrate is used as a glass substrate for a large-sized display, such a specific gravity will prevent breakage or improve the handling efficiency and is thereby effective. The specific gravity is preferably at most 2.60.

Now, the process for producing the glass plate of the present invention will be described.

To produce the glass plate of the present invention, a melting/refining step and a forming step are carried out in the same manner as in production of a conventional glass plate. Here, the glass plate of the present invention is an alkali glass substrate containing an alkali metal oxide ($Na_2O$, $K_2O$), and accordingly $SO_3$ can effectively be used as a refining agent, and float process is suitable as a forming method.

In a process for producing a glass plate, as a method of forming glass into a plate shape, preferred is to employ float process capable of easily and stably forming a glass plate having a large area, along with the production of a large-sized liquid crystal TV, etc., in recent years.

A preferred embodiment of the process for producing a glass plate of the present invention will be described.

First, molten glass obtained by melting starting materials is formed into a plate shape. For example, starting materials are blended to have a composition of a glass plate to be obtained, and the starting materials are continuously charged to a melting furnace and heated to about 1,450 to 1,650° C. to obtain molten glass. Then, the molten glass is formed into a glass plate in a ribbon shape by applying float process for example.

Then, the glass plate in a ribbon shape is withdrawn from the float process furnace, cooled to a room temperature state by a cooling means and cut to obtain a glass plate. The cooling means is a cooling means which fulfills an average cooling rate represented by $(T_H-T_L)/t$ of from 10 to 300° C./min, where $T_H$ (° C.) is the surface temperature of the glass plate in a ribbon shape withdrawn from the float process furnace, $T_L$ (° C.) is the room temperature, and t (min) is the time over which the surface temperature of the glass plate in a ribbon shape drops from $T_H$ to $T_L$. A specific cooling means is not particularly limited, and a known cooling method may be employed. For example, a method of using a heating furnace having a temperature gradient may be mentioned.

$T_H$ is the glass transition temperature Tg+20° C., specifically, preferably from 540 to 730° C.

The average cooling rate is preferably from 15 to 150° C./min, more preferably from 20 to 80° C./min, furthermore preferably from 40 to 60° C./min. By the above glass plate production process, a glass plate having a compaction (C) of at most 20 ppm can easily be obtained.

Now, a process for producing a TFT panel, which comprises a film forming step of forming a gate insulating film of an array substrate on the surface of the glass plate of the present invention will be described.

The process for producing a TFT panel of the present invention is not particularly limited so long as it comprises a film forming step of increasing the temperature of a film forming region on the surface of the glass plate of the present invention to a temperature within a range of from 150 to 300° C. (hereinafter referred to as a film forming temperature), and holding the glass plate at the film forming temperature for from 5 to 60 minutes to form the array substrate gate insulating film on the film forming region. The film forming temperature is preferably from 150 to 250° C., more preferably from 150 to 230° C., furthermore preferably from 150 to 200° C. Further, the time during which the glass plate is held at the film forming temperature is preferably from 5 to 30 minutes, more preferably from 5 to 20 minutes, furthermore preferably from 5 to 15 minutes.

The film formation of the gate insulating film is carried out within a range of the above film forming temperature and the holding time, and the glass plate undergoes heat shrinkage during the film formation. Here, once the glass plate underwent heat shrinkage, depending on the subsequent cooling conditions (such as the cooling rate), the above results of heat shrinkage are not remarkably influenced. The glass plate according to the embodiment A of the present invention has a low compaction (C), and accordingly the heat shrinkage of the glass plate is small, and slippage of the film formation pattern hardly occurs.

The film formation in the film forming step can be achieved, for example, by a known CVD method.

According to the process for producing a TFT panel of the present invention, an array substrate can be obtained by a known method. Further, using the array substrate, a TFT panel can be produced by the following known procedure.

That is, a TFT panel can be produced by a series of steps comprising a alignment treatment step of forming an alignment film on each of the array substrate and a color filter substrate and carrying out rubbing, a bonding step of bonding the TFT array substrate and the color filter substrate with high precision having a predetermined gap held, a separation step of separating cells into a predetermined size from the substrate, an injection step of injecting liquid crystal to the separated cells, and a polarizing plate bonding step of bonding a polarizing plate to the cells.

EXAMPLES

Now, the present invention will be described in detail with reference to Examples and Comparative Examples. However, it should be understood that the present invention is by no means restricted thereto.

Starting materials of the respective components were blended to achieve a desired composition ($SiO_2$ to $K_2O$) as identified by mass % in Tables, heated by using a platinum crucible at a temperature of from 1,550 to 1,650° C. for 3 hours and melted. For melting, a platinum stirrer was inserted and stirring was carried out for one hour to homogenize glass. Then, the resulting molten glass was cast, formed into a plate shape and then annealed.

Of the glass thus obtained, the specific gravity, the average coefficient of thermal expansion (unit: $\times 10^{-7}$/° C.), the strain point (unit: ° C.), the glass transition point (Tg) (unit: ° C.), the amount of $SO_3$ remaining in glass (unit: ppm), and the temperature $T_2$ (unit: ° C.) at which the viscosity of the molten glass becomes $10^2$ dPa·s and the temperature $T_4$ (unit: ° C.) at which it becomes $10^4$ dPa·s as the high temperature viscosity were measured and shown in Tables 1 to 4. Here, values in brackets in Tables are ones determined by calculation. Examples 1 to 14 and Examples 18 to 24 are Examples of the present invention, and Examples 15 to 17 are Comparative Examples.

Methods for measuring the respective physical properties are shown below.

Specific gravity: About 20 g of a glass block containing no bubbles was subjected to measurement by Archimedes' Principle.

Average coefficient of thermal expansion: Measurement was carried out by using a differential thermal dilatometer, and the average coefficient of thermal expansion from 50 to 350° C. was calculated.

Strain point: It means a value measured in accordance with JIS R3103. "*1" in the following Tables means a value higher than 650° C. by Tg value. Further, "*2" in the following Tables means a value higher than 600° C. by Tg value.

$SO_3$ remaining amount: It was determined by means of fluorescent X-rays using pulverized glass. In the following Tables, "unmeasured" means that no measurement was carried out.

High temperature viscosity: Viscosities were measured by using a rotation viscometer, and the temperature $T_2$ at which the viscosity became $10^2$ dPa·s and the temperature $T_4$ at which the viscosity became $10^4$ dPa·s were measured.

The viscosity of $10^2$ dPa·s means a standard viscosity indicating that the viscosity of the glass melt is sufficiently low in the step of melting glass. The temperature $T_2$ at which the viscosity becomes $10^2$ dPa·s is preferably at most 1,690° C., more preferably at most 1,670° C.

The viscosity of $10^4$ dPa·s is a standard viscosity at the time of float process of glass. The temperature $T_4$ at which the viscosity becomes $10^4$ dPa·s is preferably at most 1,300° C., more preferably at most 1,280° C.

Compaction (C): Measured by the above-described method for measuring the compaction (C).

TABLE 1

| | Ex. 1 | Ex. 2 | Ex. 3 | Ex. 4 | Ex. 5 | Ex. 6 | Ex. 7 |
|---|---|---|---|---|---|---|---|
| $SiO_2$ | 59.7 | 61.7 | 53.8 | 58.8 | 58.8 | 65.5 | 59.8 |
| $Al_2O_3$ | 19.6 | 19.6 | 20.3 | 19.3 | 19.6 | 19.0 | 18.9 |
| MgO | 7.8 | 7.8 | 14.7 | 7.6 | 8.2 | 10.5 | 16.1 |
| CaO | 9.9 | 9.9 | 10.2 | 9.8 | 8.4 | | |
| SrO | | | | | | | |
| $Na_2O$ | 3.0 | 1.0 | 1.0 | | 5.0 | 5.0 | 5.2 |
| $K_2O$ | | | | 4.5 | | | |
| $Na_2O + K_2O$ | 3.0 | 1.0 | 1.0 | 4.5 | 5.0 | 5.0 | 5.2 |
| MgO + CaO + SrO | 17.7 | 17.7 | 24.9 | 17.4 | 16.6 | 10.5 | 16.1 |
| $SO_3$ (amount added) (mass %) | 0.8 | 0.8 | 0.8 | 0.8 | 0.8 | 0.8 | 0.8 |
| $SO_3$ (remaining amount) (ppm) | Unmeasured | Unmeasured | Unmeasured | Unmeasured | 380 | 120 | 160 |
| Specific gravity | (2.56) | 2.57 | 2.67 | (2.55) | (2.56) | (2.46) | (2.55) |
| Average coefficient of thermal expansion ($10^{-7}/°C$) | (53.0) | 43.9 | (53.3) | (55.3) | (58.7) | (47.3) | (51.8) |
| Strain point (°C) | *1 | *1 | *1 | *1 | 668 | *1 | 686 |
| Tg (°C) | (725) | 763 | (710) | (736) | (704) | (698) | (686) |
| $T_2$ (°C) | 1537 | 1578 | 1396 | (1611) | (1530) | (1613) | (1419) |
| $T_4$ (°C) | 1196 | 1231 | 1123 | (1244) | (1181) | (1242) | (1138) |

TABLE 2

| | Ex. 8 | Ex. 9 | Ex. 10 | Ex. 11 | Ex. 12 | Ex. 13 | Ex. 14 |
|---|---|---|---|---|---|---|---|
| $SiO_2$ | 61.7 | 58.9 | 61.7 | 60.0 | 61.5 | 61.2 | 58.7 |
| $Al_2O_3$ | 18.7 | 18.7 | 16.8 | 20.6 | 17.8 | 17.8 | 17.8 |
| MgO | 7.5 | 13.0 | 7.5 | 7.5 | 4.5 | 9.8 | 7.1 |
| CaO | 5.6 | 2.8 | 7.5 | 5.6 | 5.3 | | 5.3 |
| SrO | | | | | 4.7 | 4.9 | 4.8 |
| $Na_2O$ | 2.0 | 2.0 | 2.0 | 1.9 | 1.9 | 1.9 | 1.9 |
| $K_2O$ | 4.5 | 4.6 | 4.5 | 4.4 | 4.3 | 4.4 | 4.4 |
| $Na_2O + K_2O$ | 6.5 | 6.6 | 6.5 | 6.3 | 6.2 | 6.3 | 6.3 |
| MgO + CaO + SrO | 13.1 | 15.8 | 15.0 | 13.1 | 14.5 | 14.7 | 17.2 |
| $SO_3$ (amount added) (mass %) | 0.8 | 0.8 | 0.8 | 0.8 | 0.8 | 0.8 | 0.8 |
| $SO_3$ (remaining amount) (ppm) | 300 | Unmeasured | Unmeasured | Unmeasured | Unmeasured | Unmeasured | Unmeasured |
| Specific gravity | 2.50 | (2.54) | (2.52) | (2.50) | (2.53) | (2.54) | 2.59 |
| Average coefficient of thermal expansion ($10^{-7}/°C$) | 51.6 | (56.3) | (59.2) | (56.4) | (58.3) | (54.0) | 57.8 |
| Strain point (°C) | 697 | *1 | *1 | *1 | *1 | *1 | *1 |
| Tg (°C) | 737 | (702) | (707) | (722) | (707) | (695) | 724 |
| $T_2$ (°C) | 1656 | (1508) | (1613) | (1650) | (1691) | (1602) | 1617 |
| $T_4$ (°C) | 1273 | (1189) | (1230) | (1265) | (1273) | (1236) | 1234 |

TABLE 3

| | Ex. 15 | Ex. 16 | Ex. 17 |
|---|---|---|---|
| $SiO_2$ | 59.9 | 66.5 | 72.0 |
| $Al_2O_3$ | 17.0 | 4.7 | 1.1 |
| $B_2O_3$ | 7.8 | | |
| MgO | 3.3 | 3.4 | 5.5 |
| CaO | 4.2 | 6.2 | 8.6 |
| SrO | 7.7 | 4.7 | |
| BaO | 0.1 | 3.6 | |
| $ZrO_2$ | | 1.7 | |
| $Na_2O$ | | 4.8 | 12.6 |
| $K_2O$ | | 4.4 | 0.2 |
| $Na_2O + K_2O$ | | 9.2 | 12.8 |
| MgO + CaO + SrO + BaO | 15.3 | 17.9 | 14.1 |
| $SO_3$ (amount added) (mass %) | 0.8 | 0.8 | 0.8 |
| $SO_3$ (remaining amount) (ppm) | 30 | Unmeasured | Unmeasured |
| Specific gravity | 2.5 | 2.77 | 2.49 |
| Average coefficient of thermal expansion ($10^{-7}/°C$) | 37 | 83 | 86 |
| Strain point (°C) | 670 | 570 | 510 |
| Tg (°C) | 720 | 625 | 560 |
| $T_2$ (°C) | 1660 | 1551 | 1461 |
| $T_4$ (°C) | 1268 | 1141 | 1040 |

TABLE 4

| | Ex. | | | | | | |
|---|---|---|---|---|---|---|---|
| | 18 | 19 | 20 | 21 | 22 | 23 | 24 |
| $SiO_2$ | 64.2 | 65.6 | 66.0 | 63.1 | 62.2 | 61.5 | 60.6 |
| $Al_2O_3$ | 18.6 | 19.0 | 15.0 | 15.0 | 16.6 | 15.2 | 20.9 |
| $B_2O_3$ | | | | | 2.2 | 1.1 | 2.2 |
| MgO | 6.2 | 10.4 | 7.2 | 11.9 | 8.0 | 12.0 | 4.1 |
| CaO | 4.7 | | 2.8 | | 2.0 | 1.0 | |
| SrO | | | | | | | 1.9 |
| $Na_2O$ | 1.9 | 5.0 | 9.0 | 4.0 | 9.0 | 6.1 | 8.6 |
| $K_2O$ | 4.4 | | | 6.0 | | 3.1 | 1.7 |
| $Na_2O + K_2O$ | 6.3 | 5.0 | 9.0 | 10.0 | 9.0 | 9.2 | 10.3 |
| MgO + CaO + SrO | 10.9 | 10.4 | 10.0 | 11.9 | 10.0 | 13.0 | 6.0 |
| $SO_3$ (amount added) (mass %) | 0.8 | 0.8 | 0.8 | 0.8 | 0.8 | 0.8 | 0.8 |
| $SO_3$ (remaining amount) (ppm) | Unmeasured | Unmeasured | Unmeasured | Unmeasured | Unmeasured | Unmeasured | Unmeasured |
| Specific gravity | 2.46 | 2.46 | 2.47 | 2.48 | 2.47 | 2.50 | 2.44 |
| Average coefficient of thermal expansion ($10^{-7}/°$ C.) | (54) | (47) | At most 60 | At most 60 | At most 60 | At most 60 | At most 60 |
| Strain point (° C.) | *1 | *1 | *2 | *2 | *2 | *2 | *2 |
| Tg (° C.) | (717) | (698) | (650) | (666) | (641) | (651) | (656) |
| $T_2$ (° C.) | (1716) | (1613) | (1578) | (1547) | (1533) | (1479) | (1675) |
| $T_4$ (° C.) | (1296) | (1242) | (1181) | (1190) | (1147) | (1137) | (1234) |
| Compaction (C) | 6 | 14 | 11 | 25 | 19 | 12 | At most 20 |

As evident from Tables 1, 2 and 4, glass in each of Examples of the present invention (Examples 1 to 14 and Examples 18 to 24) has an average coefficient of thermal expansion of at most $60 \times 10^{-7}/°$ C. and a strain point of at least 600° C., and accordingly when it is used as a glass plate for an LCD panel, the change in dimensions in a process for producing an LCD panel can be suppressed.

Further, as evident from Table 4, glass in each of Examples of the present invention (Examples 18 to 20 and Examples 22 to 24) has a compaction (C) of at most 20 ppm, and accordingly when it is used as a glass plate for a TFT panel, heat shrinkage of the glass plate can be suppressed in heat shrinkage at low temperature in a process for producing a TFT panel.

Further, glass of each of Examples of the present invention (Examples 1 to 14 and Examples 18 to 24) has a specific gravity of at most 2.7, and accordingly it can be suitably used as a glass plate for a light weight TFT panel.

On the other hand, in Example 15 in which $B_2O_3$ is contained in a large amount, the homogeneity of glass and the flatness when the glass is formed into a plate shape are likely to be influenced by the volatilization at the time of melting glass. Further, as evident from Table 3, refining by $SO_3$ is insufficient since no alkali oxide is contained. Further, in Examples 16 and 17, the average coefficient of thermal expansion is so high as about $80 \times 10^{-7}/°$ C., the change in dimensions in a process for producing an LCD panel may be influenced.

An Example for production of a glass plate according to the preferred embodiment of the present invention will be shown.

Starting materials of the respective components are blended to achieve a glass composition as identified in Table 1, 2 or 4, and the starting materials are continuously charged into a melting furnace and melted at a temperature of from 1,550 to 1,650° C. Then, the molten glass is continuously formed into a glass plate in a ribbon shape by float process, withdrawn from the float furnace at a glass plate surface temperature of the transition temperature Tg+20° C., and cooled by a cooling furnace at an average cooling rate of from 40 to 60° C./min until the surface temperature of the glass plate becomes room temperature ($T_L = 25°$ C.). Then, the glass plate is cut into predetermined dimensions (one side being 2 m or longer). In the compositions of glass shown in Table 4 (Examples 18 to 20 and Examples 22 to 24), a glass plate according to the embodiment A having a compaction (C) of at most 20 ppm can be obtained.

In the present invention, since $SO_3$ is used as a refining agent in the step of melting glass, an excellent refining effect is obtained, and glass with a small number of bubbles is obtained. Further, since the $B_2O_3$ content is at most 3%, glass excellent in flatness is obtained.

The glass plate of the present invention can be suitably used as a glass plate particularly for a large-sized (one side being 2 m or longer) TFT panel.

An Example for production of a TFT panel of the present invention will be shown.

In an array substrate production process, the glass plate of the present invention is cleaned, and then gate electrodes and wiring patterns are formed.

Then, the glass plate is held at a film forming temperature of 250° C. for 15 minutes, and a gate insulating film is formed by the CVD method.

Then, an a-Si film is formed, and a channel protective film is formed, followed by patterning to form patterns.

Then, a N$^+$ type a-Si film, pixel electrodes and contact patterns are formed.

Then, source/drain electrodes are formed, and then a protective film is formed to obtain a TFT array substrate. Then, a TFT panel is obtained by the following known steps.

That is, a TFT panel can be produced by a series of steps comprising an alignment treatment step of forming an alignment film on each of the above array substrate and a color filter substrate and carrying out rubbing, a step of bonding the TFT array substrate and the color filter substrate with high precision having a predetermined gap held, a separation step of separating cells into a predetermined size from the substrate, an injection step of injecting liquid crystal to the separated cells, and a polarizing plate bonding step of bonding a polarizing plate to the cells.

The glass plate according to the embodiment A of the present invention has a compaction (C) of at most 20 ppm, and accordingly even when it is subjected to such a process for producing a TFT panel, heat shrinkage is small, and slippage of the film formation pattern hardly occurs.

INDUSTRIAL APPLICABILITY

The glass plate of the present invention is suitable as a glass substrate for an LCD panel, and it can be used as a substrate for other displays, such as a plasma display panel (PDP) and an inorganic electroluminescence display. Further, it can be used also as a glass plate for a solar battery substrate.

The entire disclosure of Japanese Patent Application No. 2007-225945 filed on Aug. 31, 2007 including specification, claims and summary is incorporated herein by reference in its entirety.

What is claimed is:

1. A glass plate which comprises, as a glass matrix composition as represented by mass % based on oxide:

| | |
|---|---|
| $SiO_2$ | 53 to 74, |
| $Al_2O_3$ | 15 to 23, |
| $B_2O_3$ | 0 to 3, |
| MgO | 2 to 17, |
| CaO | 0 to 12, |
| SrO | 0 to 6, |
| MgO + CaO + SrO | 6 to 28, |
| $Na_2O$ | 0 to 9, |
| $K_2O$ | 0 to 6, |
| $Na_2O + K_2O$ | 0.8 to 11, | wherein said glass plate comprises from 100 to 500 ppm of $SO_3$, has an average coefficient of thermal expansion from 50 to 350° C. of at most $60 \times 10^{-7}$/° C., has a strain point of at least 600° C., and has a heat shrinkage (C) of at most 20 ppm.

2. The glass plate according to claim 1, wherein the amount of $Na_2O+K_2O$ is at most 9%, as represented by mass % based on oxide.

3. The glass plate according to claim 1, further comprising as represented by mass % based on oxide, $Li_2O$ in an amount of from 0-5%.

4. The glass plate according to claim 1, further comprising as represented by mass % based on oxide, $Na_2O+K_2O+Li_2O$ in an amount of from 1 to 9%.

5. A process for producing a glass plate, which comprises blending starting materials so as to obtain glass comprising as a glass matrix composition as represented by mass % based on oxide:

| | |
|---|---|
| $SiO_2$ | 53 to 74, |
| $Al_2O_3$ | 15 to 23, |
| $B_2O_3$ | 0 to 3, |
| MgO | 2 to 17, |
| CaO | 0 to 12, |
| SrO | 0 to 6, |
| MgO + CaO + SrO | 6 to 28, |
| $Na_2O$ | 0 to 9, |
| $K_2O$ | 0 to 6, and |
| $Na_2O + K_2O$ | 0.8 to 11 | adding a sulfate in an amount of from 0.05 to 1.0 mass % as calculated as $SO_3$ to 100 mass % of the starting materials to obtain a glass material, melting the glass material and forming the molten glass material into plate glass to obtain the glass plate as defined in claim 1.

6. A process for producing a glass plate, which comprises forming molten glass obtained by melting starting materials into a glass plate in a ribbon shape in a float process furnace, and cooling the glass plate by a cooling means to obtain the glass plate as defined in claim 1 in a room temperature state, wherein the cooling means is a cooling means which fulfils an average cooling rate represented by $(T_H-T_L)/t$ of from 10 to 300° C./min, where $T_H$ (° C.) is the surface temperature of the glass plate withdrawn from the float process furnace, $T_L$ (° C.) is the room temperature, and t (min) is the time over which the surface temperature of the glass plate cooled by the cooling means drops from $T_H$ to $T_L$.

7. A process for producing a TFT panel, which comprises a film forming step of forming an array substrate gate insulating film on the surface of a glass plate and a bonding step of bonding the array substrate and a color filter substrate, wherein the film forming step is a step of increasing the temperature of a film forming region on the surface of the glass plate as defined in claim 1 to a film forming temperature within a range of from 150 to 300° C., and holding the glass plate at the film forming temperature for from 5 to 60 minutes to form the gate insulating film on the film forming region.

8. The glass plate according to claim 1, which contains substantially no $B_2O_3$, comprises as a glass matrix composition as represented by mass % based on oxide:

| | |
|---|---|
| $SiO_2$ | 53 to 74, |
| $Al_2O_3$ | 15 to 23, |
| MgO | 2 to 17, |
| CaO | 0 to 12, |
| SrO | 0 to 6, |
| MgO + CaO + SrO | 10 to 28, |
| $Na_2O$ | 0 to 9, |
| $K_2O$ | 0 to 6, |
| $Na_2O + K_2O$ | 0.8 to 9, | wherein said glass plate comprises from 100 to 500 ppm of $SO_3$, and has a strain point of at least 650° C.

9. The glass plate according to claim 8, which contains substantially no $B_2O_3$, comprises as a glass matrix composition as represented by mass % based on oxide:

| | |
|---|---|
| $SiO_2$ | 58 to 67, |
| $Al_2O_3$ | 15 to 21, |
| MgO | 4 to 14, |
| CaO | 0 to 5, |
| SrO | 0 to 3, |
| MgO + CaO + SrO | 10 to 19, |
| $Na_2O$ | 1 to 9, |
| $K_2O$ | 0 to 5, |
| $Na_2O + K_2O$ | 1 to 9, | wherein said glass plate comprises from 100 to 500 ppm of $SO_3$, and has a heat shrinkage (C) of at most 20 ppm.

10. A process for producing a glass plate, which comprises blending starting materials so as to obtain glass containing substantially no $B_2O_3$ and comprising as a glass matrix composition as represented by mass % based on oxide:

| | |
|---|---|
| $SiO_2$ | 58 to 67, |
| $Al_2O_3$ | 15 to 21, |
| MgO | 4 to 14, |
| CaO | 0 to 5, |
| SrO | 0 to 3, |
| MgO + CaO + SrO | 10 to 19, |
| $Na_2O$ | 1 to 9, |
| $K_2O$ | 0 to 5, and |
| $Na_2O + K_2O$ | 1 to 9 | adding a sulfate in an amount of from 0.05 to 1.0 mass % as calculated as $SO_3$ to 100 mass % of the starting materials to obtain a glass material, melting the glass material and forming the molten glass material into plate glass to obtain the glass plate as defined in claim 9.

11. A process for producing a glass plate, which comprises blending starting materials so as to obtain glass containing substantially no $B_2O_3$ and comprising as a glass matrix composition as represented by mass % based on oxide:

| | |
|---|---|
| $SiO_2$ | 53 to 74, |
| $Al_2O_3$ | 15 to 23, |
| MgO | 2 to 17, |
| CaO | 0 to 12, |
| SrO | 0 to 6, |
| MgO + CaO + SrO | 10 to 28, |
| $Na_2O$ | 0 to 9, |
| $K_2O$ | 0 to 6, and |
| $Na_2O + K_2O$ | 0.8 to 9 | adding a sulfate in an amount of from 0.05 to 1.0 mass % as calculated as $SO_3$ to 100 mass % of the starting materials to obtain a glass material, melting the glass material and forming the molten glass material into plate glass to obtain the glass plate as defined in claim 8.

12. The glass plate according to claim 1, which comprises as a glass matrix composition as represented by mass % based on oxide:

| | |
|---|---|
| $SiO_2$ | 58 to 67, |
| $Al_2O_3$ | 15 to 21, |
| $B_2O_3$ | 0 to 3, |
| MgO | 4 to 14, |
| CaO | 0 to 5, |
| SrO | 0 to 3, |
| MgO + CaO + SrO | 6 to 19, |
| $Na_2O$ | 1 to 9, |
| $K_2O$ | 0 to 5, |
| $Na_2O + K_2O$ | 1 to 11, | wherein said glass plate comprises from 100 to 500 ppm of $SO_3$, and has a heat shrinkage (C) of at most 20 ppm.

13. A process for producing a glass plate, which comprises blending starting materials so as to obtain glass comprising as a glass matrix composition as represented by mass % based on oxide:

| | |
|---|---|
| $SiO_2$ | 58 to 67, |
| $Al_2O_3$ | 15 to 21, |
| $B_2O_3$ | 0 to 3, |
| MgO | 4 to 14, |
| CaO | 0 to 5, |
| SrO | 0 to 3, |
| MgO + CaO + SrO | 6 to 19, |
| $Na_2O$ | 1 to 9, |
| $K_2O$ | 0 to 5, and |
| $Na_2O + K_2O$ | 1 to 11 | adding a sulfate in an amount of from 0.05 to 1.0 mass % as calculated as $SO_3$ to 100 mass % of the starting materials to obtain a glass material, melting the glass material and forming the molten glass material into plate glass to obtain the glass plate as defined in claim 12.

\* \* \* \* \*